May 7, 1963 R. P. HURLEBAUS 3,089,020

INDIRECT WELDING

Filed Dec. 16, 1960

INVENTOR.
Richard P. Hurlebaus

BY [signature]

ATTORNEY

United States Patent Office 3,089,020
Patented May 7, 1963

3,089,020
INDIRECT WELDING

Richard P. Hurlebaus, Huntingdon Valley, Pa., assignor to The Budd Company, Philadelphia, Pa., a corporation of Pennsylvania Filed Dec. 16, 1960, Ser. No. 76,175
2 Claims. (Cl. 219—86)

This invention pertains to indirect welding means and methods for connecting lead conductors to printed circuit-type metal foil electrical components, particularly strain gauges.

There are many applications where it is necessary to make electrical and mechanical connections of attenuated metallic foil or film components and lead conductors for circuit interconnection of the components. In the past such connections have been by means of soldering operations wherein a separate solder material is fused between the component and the lead conductor. The soldering, because of the substantial time during which heat must be applied, is often destructive or disruptive of the physical, chemical, and electrical properties of the component.

These problems are magnified in the case of bonded resistance foil strain gauges adhesively attached to a workpiece by means of a thin cement layer which must also provide electrical insulation from the workpiece. Further, the introduction of the solder resistance and of the dissimilar metal-to-metal junctions at the opposed solder surfaces may generate errors which are significant in the presently refined state of the strain gauge art.

Welding has been attempted in the past as an alternative to soldering, but without satisfactory results. Even where direct welding could be practiced in the attachment of intermediate strain gauge leads to foil strain gauges before application of the gauge to the workpiece, the concentrated heat paths through the attenuated metal foils often caused actual burn through of the foil or other destructive heat effects upon the properties of the sensitive component materials.

Therefore, it is the general object of this invention to provide means and methods for the in situ electrical and mechanical interconnection of lead conductors and metal foil electrical components yielding homogenous bonds, reproducibly and efficiently, within any generally encountered environment.

A more specific object is to provide a welding method for connecting lead conductors and metal foil components in situ and which method substantially reduces the disrupting effects of current path concentration and protracted heating at the welding position.

Another specific object of this invention is to provide a portable indirect welding tool for use in the field for in situ electrical and mechanical connection of lead conductors and metal foil electrical components whereby welding conditions are substantially reproduced regardless of the environment of the welding position and whereby mechanically strong, electrically low resistance, autogenous welds may be accomplished efficiently and quickly without disruptive effect upon the lead, the component, or upon their environment.

According to a preferred method of this invention, mechanical and electrical connection of a lead conductor to a foil component is accomplished by superimposing the lead over a faying surface area of the component, contacting a first portion of the lead substantially symmetrically within the faying surface with a first electrode, contacting second and third portions of the lead spaced substantially equally from the first portion with a second electrode, and passing a single pulse of welding current serially through the one electrode, the lead conductor, the foil component, again through the lead conductor, and finally through the other electrode in that order.

An illustrated embodiment of indirect welding apparatus according to this invention comprises a first electrode and a second electrode encompassing the first electrode, the first electrode being translatable relative to the second electrode from a retracted position within the second electrode to an extended position coplanar with the surface of the second electrode, and means establishing a predetermined normal pressure on the first electrode at its extended position.

The features of this invention believed to be novel are distinctly pointed out in the appended claims; however, a better understanding of the invention will be had upon consideration of the following specification taken in conjunction with the accompanying drawing wherein:

Figures 1, 2, 3, 4, 5:
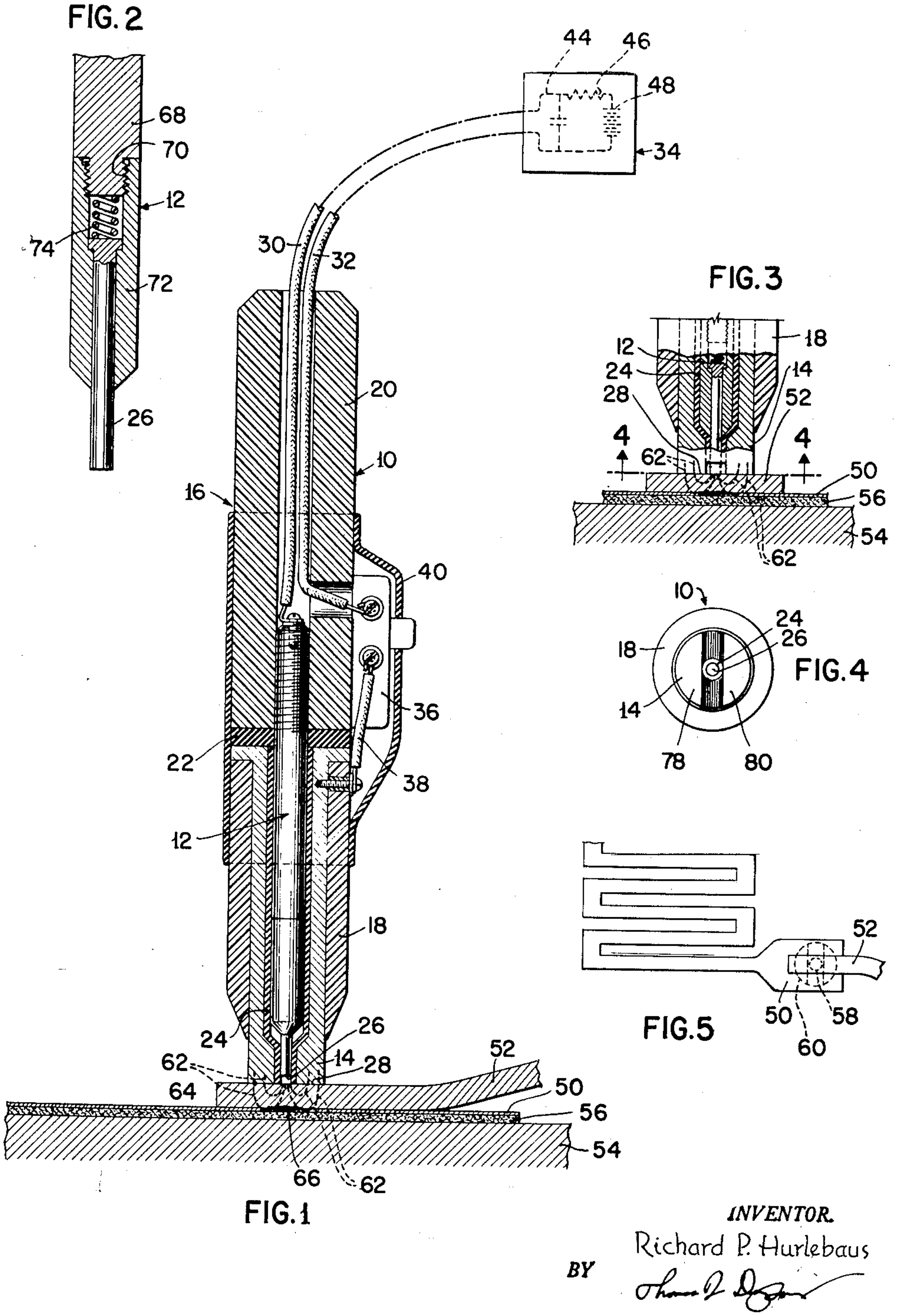
FIG. 1 is a cross-sectional elevation of an indirect foil welder according to this invention.
FIG. 2 is a detailed view of the inner electrode of the welder of FIG. 1.
FIG. 3 is an elevation and FIG. 4 a plan view of an alternative configuration for the outer electrode of the FIG. 1 welder.
FIG. 5 illustrates the superposition of inner and outer welder electrodes over the faying surface between a strain gauge tab and a lead conductor.

With particular reference to FIG. 1, the indirect welder 10 comprises, concentrically, an inner electrode assembly 12, an outer annular electrode 14, and a composite handle 16. The lower insulated handle element 18 is affixed to the outer electrode 14, and the upper insulated handle element 20 is mechanically connected to the latter means of resilient washer 22. Inner electrode assembly 12 is threadedly engaged in upper handle element 20 and may be extended slidably within a cylindrical inner insulator 24 from the normal retracted position illustrated, to an operative position wherein inner electrode tip 26 is coplanar with the lateral surface 28 of outer electrode 14.

Inner electrode lead 30 and outer electrode lead 32 extend to a welding current source 34. Connection to the outer electrode 14 is by way of normally open switch 36 and intermediate electrode lead 38. Housing of the electrical elements of the welder 10 is completed by a resilient sleeve 40 of rubber or the like.

Welding current source 34 comprises compacitor 44 charging resistor 46, and a D.C. potential source 48. Electrical energy stored by capacitor 44 is discharged, at will, through a circuit connected in series between inner electrode tip 26 and outer electrode surface 28 when switch 36 is closed. Capacitor 44 is recharged within a few seconds after the discharge circuit is broken.

While the schematically illustrated portable battery operated power source 34 is preferred for use in the field, a rectified A.C. power supply may be substituted. As an example, a source potential of 450 v. and a capacitance of 400 $\mu$f. yield satisfactory welding pulses.

Welder 10 in FIG. 1 is shown in operational position with respect to a strain gauge tab 50 and a lead connector 52, both formed from attenuated metal foil. The dimensions of the foil elements are exaggerated in the drawing because, in actual practice, strain gauge foil thicknesses are in the range of 10,000ths of an inch and lead connector foil thicknesses are in the range of 1,000ths of an inch. Strain gauge tab 50 is in its final orientation with respect to workpiece 54 and is insulated therefrom by a thin insulating cement layer 56.

Electrode positioning is illustrated in FIG. 5, with circle 58 representing the inner electrode contact area and circle 60 representing the periphery of the outer electrode contact area. Faying surface area is defined as the contact area between strain gauge tab 50 and lead 52.

Welder 10 is operated by manually applying pressure to upper handle element 20, compressing resilient washer 22 and translating inner electrode assembly 12 axially of outer electrode 14 until inner electrode tip 26 applies normal pressure upon the foils to be welded.

An explanation for the success of indirect welding according to this invention may be had upon further consideration of FIG. 1. The lead conductor 52 is shown in side view superimposed over gauge tab 50. Assuming inner electrode tip 26 has been translated into contact with lead 52 and switch 36 to have been closed, current flux paths 62 will diverge from the single first electrode contact area and divide between the spaced second electrode contact areas. Even though the faying surface 64 presents a high resistivity barrier, electromagnetic interaction causes the flux paths to penetrate into, and complete their circuit, through gauge tab 50. Since resistivity is greatest at the faying surface 64, it is here that most of the electrical energy is dissipated in the form of heat. The result is that fusion of a weld nugget 66 occurs over a considerable lateral area without penetration of the extremely thin foil of gauge tab 50. This so-called indirect welding yields a relatively large area autogenous bond substantially eliminating connection resistance but simultaneously contributing maximum mechanical strength.

Due to the fact that the maximum temperature is developed at the interface between lead conductor and gauge tab, as opposed to the case where heat is conducted from an outer surface of a component to be joined into the interior where a soldering operation takes place, there is little temperature effect upon the environment of the welding position. Even the thinnest of conventional insulating layers 56 is maintained intact during these heating cycles.

The normal pressure applied by the inner electrode at the welding position is a critical variable in the success of the invention. Because the inner electrode contact is over a single area, it is necessary to avoid excessive normal pressures to obviate perforation, indentation and edge burn. It has been found, however, that by making inner electrode pressure independent of the manually applied external electrode pressure, successful practice can be very nearly assured for even the most inexperienced technician.

FIG. 2 illustrates in cross-section a means for decoupling inner electrode pressure from manually produced outer electrode pressure. The inner electrode assembly 12 comprises an upper cylindrical element 68 including threaded boss 70, a lower cylindrical element 72 through which inner electrode tip 26 is coaxially translatable, and an inner electrode normal pressure spring 74 urging tip 26 outwardly of element 72. After inner electrode assembly 12 has been translated to a position where inner electrode tip 26 makes contact at a welding position, the inner electrode pressure becomes a function of the predeterminable properties of spring 74, substantially independent of the manually applied outer electrode pressure.

FIG. 3 in partial elevation, and FIG. 4, in bottom plan view, illustrate a preferred configuration for outer electrode 14 of the welder 10 of FIG. 1. Outer electrode 14 is diametrically bifurcated to define segmental contact surfaces 78 and 80. The bifurcated configuration is especially desirable where faying surface areas exceed outer electrode surface areas both in length and in width in order to define further the desired welding current flux path divergence described previously in connection with FIG. 1. However, in the particular illustrated example, where the lead conductor is much narrower than the outer electrode, an annular outer electrode contact surface configuration may obviate rotational positioning of the welder.

While proper adjustment of the variables for a given welding operation may be readily determined empirically, the following are given by way of a specific example. For an inner electrode diameter of $\frac{1}{32}''$, an inner electrode normal pressure generated by a spring force of 1.1 ounces, a gauge foil thickness of .00015'', and a lead thickness of .002'', single weld current pulses of 6 to 15 watt-seconds will produce optimum electrical and mechanical bonds between strain gauge tabs and strain gauge leads of conventional materials.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of mechanical and electrical connection of attenuated metal lead conductors and foil components comprising the steps of superimposing a lead over a faying surface area of a component, contacting a first portion of the lead substantially symmetrically within the faying surface with a first electrode, contacting a second portion of the lead spaced symmetrically from the first portion with a second electrode, and passing a single capacitor-discharge pulse serially through the one electrode, the lead conductor, the foil component, again through the lead conductor, and finally through the other electrode in that order.

2. An indirect welder for the mechanical and electrical connection of attenuated metal lead and metal foil component workpieces, which welder comprises an insulated handle, a first electrode attached to said handle having an axially translatable cylindrical tip and spring means urging said tip to a normally extended position, a second electrode having an annular tip coaxially encompassing said cylindrical tip, and resilient axially deformable means coupling said second electrode to said handle normally orienting said annular tip at an axially extended position relative to said cylindrical tip.

References Cited in the file of this patent

UNITED STATES PATENTS

| | | |
|---|---|---|
| 2,045,523 | Fassler | June 23, 1936 |
| 2,101,156 | Payne | Dec. 7, 1937 |
| 2,272,968 | Dyer | Feb. 10, 1942 |